United States Patent [19]
VandenHoek et al.

[11] 4,429,934
[45] * Feb. 7, 1984

[54] PANEL WIRING SYSTEM

[75] Inventors: Harold L. VandenHoek, Grand Rapids; Larry A. Speet, Holland; Robert G. Mohr, Grand Rapids, all of Mich.

[73] Assignee: Steelcase Inc., Grand Rapids, Mich.

[*] Notice: The portion of the term of this patent subsequent to May 20, 1997 has been disclaimed.

[21] Appl. No.: 351,167

[22] Filed: Feb. 22, 1982

Related U.S. Application Data

[63] Continuation of Ser. No. 79,490, Sep. 27, 1979, Pat. No. 4,376,561, and a continuation-in-part of Ser. No. 909,975, May 26, 1978, Pat. No. 4,203,639.

[51] Int. Cl.³ .............................................. H01R 39/00
[52] U.S. Cl. ................................................... 339/22 R
[58] Field of Search ..................... 339/20, 21 R, 22 R, 339/23, 184–186

[56] References Cited

U.S. PATENT DOCUMENTS

| | | | |
|---|---|---|---|
| 2,124,207 | 7/1938 | Neesen | 339/184 M |
| 2,312,580 | 3/1943 | O'Brien | 339/22 R |
| 2,313,960 | 3/1943 | O'Brien | 339/23 |
| 3,248,576 | 4/1966 | Russell | 339/23 |
| 4,043,626 | 8/1977 | Propst et al. | 339/23 |
| 4,056,297 | 11/1977 | Gartung | 339/23 |
| 4,060,294 | 11/1977 | Haworth et al. | 339/22 R |
| 4,203,639 | 5/1980 | VandenHoek et al. | 339/22 R |
| 4,231,630 | 11/1980 | Propst et al. | 339/22 R |
| 4,235,495 | 11/1980 | Propst et al. | 339/22 R |
| 4,241,965 | 12/1980 | Wilson et al. | 339/22 R |

FOREIGN PATENT DOCUMENTS

| | | | |
|---|---|---|---|
| 2259231 | of 1974 | Fed. Rep. of Germany | 339/184 M |
| 1099300 | of 1955 | France | |
| 345492 | of 1931 | United Kingdom | 339/184 M |
| 545417 | of 0000 | United Kingdom | |
| 1172511 | of 0000 | United Kingdom | |

OTHER PUBLICATIONS

U.K. Publication 200413279, published Mar. 21, 1979.

Primary Examiner—Joseph H. McGlynn
Attorney, Agent, or Firm—Price, Heneveld, Huizenga & Cooper

[57] ABSTRACT

The specification discloses a hard wired, free standing movable room divider panel system in which wiring is provided for two separate circuits, one of which is especially adapted for connecting to panel mounted lighting through an internal quick disconnect connector. This is referred to as the lighting circuit. The second circuit is adapted only for mounting conventional outlet receptacles via quick disconnect connectors. The wiring terminates in connectors which provide terminals for connecting into the lighting circuit, terminals for connecting into the power circuit and terminals for connecting into both circuits which facilitate electrically connecting adjacent panels through a panel power connector. In one embodiment of the invention, conventional outlets receptacles can optionally be connected to the lighting circuit as well. However, the two types of conventional outlets cannot be inadvertently connected to the wrong circuit.

27 Claims, 14 Drawing Figures

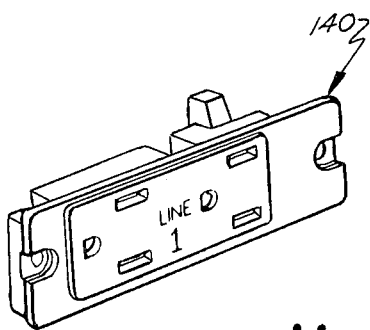
Fig. 11.
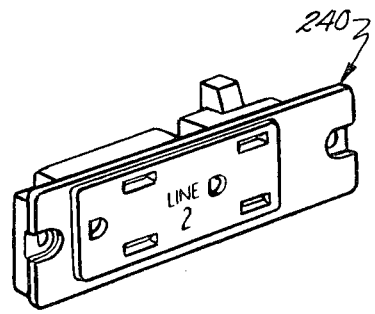
Fig. 13.
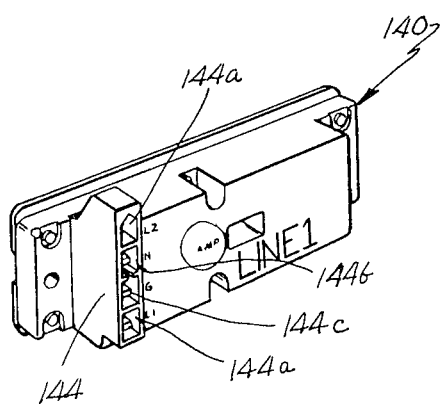
Fig. 12.
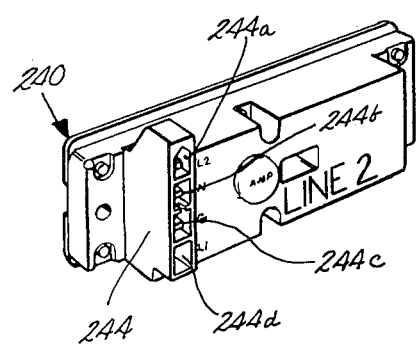
Fig. 14.
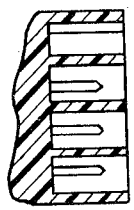
Fig. 12.A
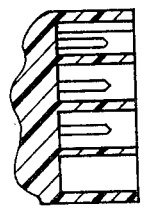
Fig. 14.A

PANEL WIRING SYSTEM

CROSS REFERENCE TO RELATED APPLICATION

This is a continuation of application Ser. No. 79,490, filed Sept. 27, 1979, now U.S. Pat. No. 4,376,561, and a continuation-in-part of co-pending application Ser. No. 909,975, filed May 26, 1978 and entitled "Panel Wiring System," now U.S. Pat. No. 4,203,639.

BACKGROUND OF THE INVENTION

The present invention relates to free standing, movable panel systems which are hard wired with electrical wiring. Hard wired systems include enclosed electrical wiring which is usually prewired into the panels at the factory or field installed with prewired modules. This is distinguished from merely providing a wiring way into which electrical cords or "casual wiring" can be laid. Hard wiring is encased in some form of conduit or enclosure so as to be inaccessible to the user at least without the use of tools.

This distinction is important in complying with local electrical codes. Codes typically prevent one from running casual wiring from panel to panel. Thus, in offices without hard wired panels, the advance planning must be very carefully done so that an electrical power tombstone can be located in each work area which is to be enclosed by the panels. The design of an office system around such panels becomes quite difficult.

Prior art hard wired panel systems have the wiring enclosed in a wiring way at the base of the panel. At least one electrical outlet or plug receptacle is usually located along each wiring way. This allows one to plug in office equipment and lighting fixtures which are typically mounted on the panel.

One problem with such a system is that you can only load a given circuit to certain limits. Accordingly, where everyone in the office has lights and office equipment to plug in, one may have to limit the number of panels interconnected on a single electrical circuit to that number which will provide for only two or three work stations. A single circuit including lighting which is considered a continuous load must by code be reduced 20% in allowable current carrying capacity. This further reduces the single circuit system efficiency.

Also, electrical codes typically limit the number of receptacles one can place on a single circuit. Typically, one must limit the number of outlet locations on the circuit to twelve. To avoid putting outlets where they are not needed and to thereby maximize outlet location on a single circuit, one again needs to very carefully plan his office system in advance and order some of the panels without outlets included. If one changes the system at a later data and wants an outlet in a panel which has previously been ordered without one, one either has to rebuild the panel, order a new panel, or rearrange existing panels in some way.

Another drawback to existing hard wired panel systems lie in the panel power connector which extends between adjacent panels and carries current from one to the other. If a cable is used between adjacent panels, the cable is readily visible and unsightly when one adjusts adjacent panels so as to be at an angle to one another rather than in a straight line. The cable is visible at the outside of the apex of the angle.

The only way heretofore conceived to avoid this problem is to employ a panel power connector which has surfaces which are decoratively coherent with the base covers typically employed to cover wiring ways and which includes some sort of hinge between its two segments.

SUMMARY OF THE INVENTION

In the present invention, the problem of overloading a single circuit and of causing a simultaneous blackout of lighting and equipment (due typically to an equipment overload) is obviated by providing a hard wired, free standing panel system in which both a light circuit and a power circuit are provided. First quick disconnect connector means having a configuration not that of a conventional plug receptacle are connected to the lighting circuit whereby lighting can be connected thereto, second quick disconnect connector means having a configuration not that of a conventional plug receptacle are connected to the power circuit whereby electrical outlet or plug receptacles can be connected thereto and third connector means are provided which are connected to both the lighting and power circuits and which facilitate electrically interconnecting adjacent panels. Electrical interconnection is achieved by providing a panel power connector which can be joined at its ends to the third connectors in adjacent panels.

The problem of trying to design the system to meet code limitations on the number of outlet locations is obviated by providing conventional electrical receptacle units which include a conventional electrical receptacle in a housing and quick disconnect means connected to the conventional electrical receptacle and projecting from the housing. Mating quick disconnect connector means are provided which are connected to the power circuit in the panel whereby such conventional electrical outlet units can be connected to any of the panels in the system.

In another aspect of the invention, two different types of conventional receptacle units are provided, one of which is adapted for connection to said power circuit and the other of which is designed for connecting to said lighting circuit.

These and other objects, aspects and features of the invention will be more fully understood and appreciated by reference to the written specification and appended drawings.

BRIEF DESCRIPTION OF THE DRAWINGS

FIG. 11 is a perspective view of an alternative conventional receptacle which like receptacle 40 is adapted exclusively for connecting to the power circuit;

FIG. 12 is a rear perspective view thereof;

FIG. 12A is a fragmentary, vertical cross-sectional view of the receptacle shown in FIG. 12.

FIG. 13 is a front perspective view of a conventional receptacle adapted exclusively for connecting to the lighting circuit; and FIG. 14 is a rear view thereof.

FIG. 14A is a fragmentary, vertical cross-sectional view of the receptacle shown in FIG. 14.

DESCRIPTION OF THE PREFERRED EMBODIMENT

Figure 1:
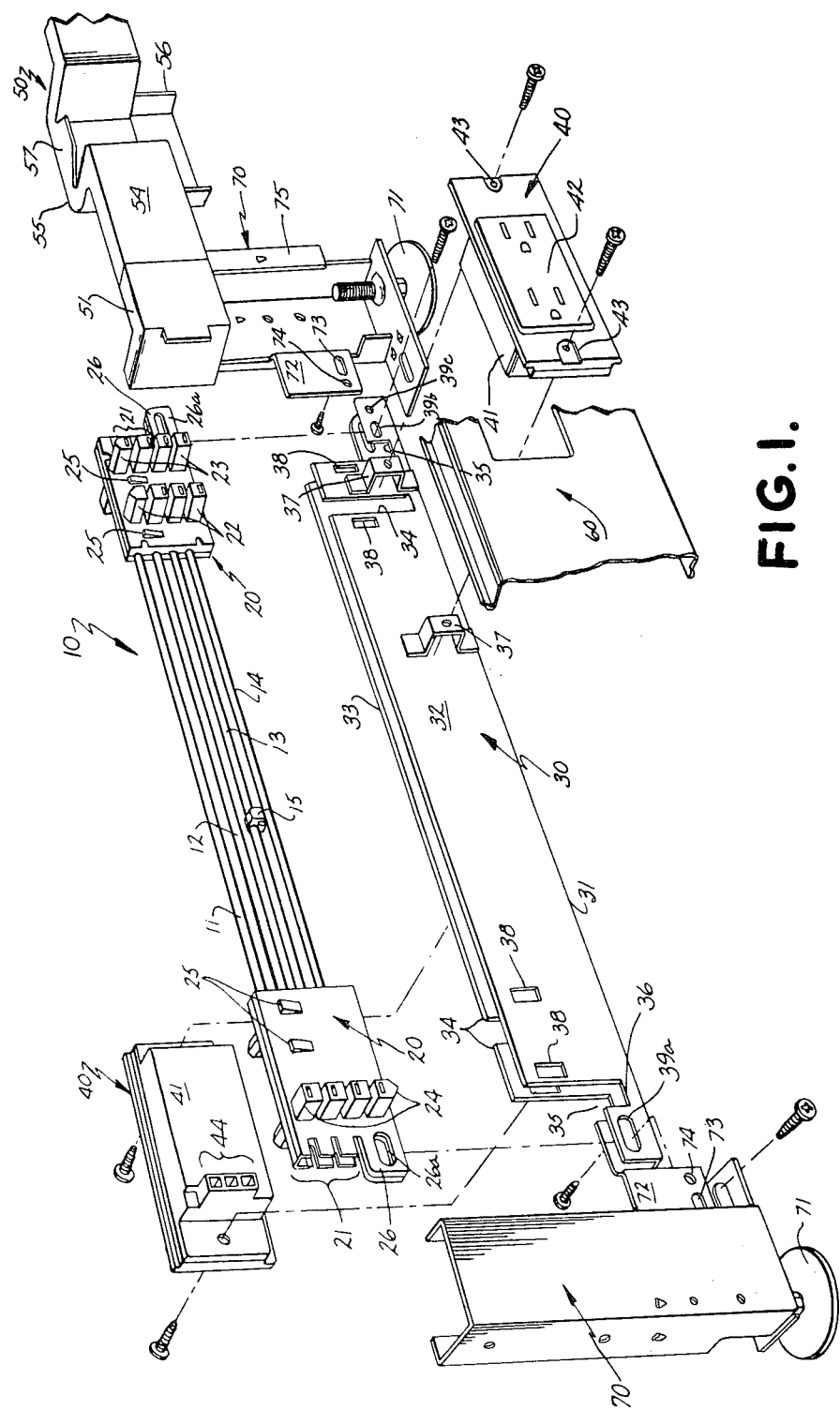
FIG. 1 is an exploded view of the electrical components and related mounting components of a panel made in accordance with the present invention.

In the preferred embodiment, the panels 1 employed in the panel system of the present invention include wiring 10 extending between "J" connectors 20 within a wiring way 30 located at the base of the panel 1 (FIGS. 1 and 2) The four wires 11 through 14 of wiring 10 define a multi-branch circuit, which in practical effect is two circuits, such that one circuit can be used for lighting and the other for power for office machinery. Each "J" connector 20 includes a set of quick disconnect terminals 21 to allow one to connect lighting to the lighting circuit, a second set of quick disconnect terminals 22 which allow one to snap in a conventional receptacle unit 40, and a third and a fourth set of quick disconnect terminals 23 and 24, each of which is electrically connected to both circuits to allow one to introduce power into the system, or to transfer power from panel to panel through a panel power connector 50. Wiring way 30 can be secured to panel feet 70 at the base of the panel from either side of the panel and all of this is then concealed from view by a base trim cover 60 which snaps into position at the base of panel 1.

Wiring 10 is comprised of conventional electrical wires 11 through 14. They comprise a multi-branch circuit wherein wire 11 comprises one hot wire, wire 12 comprises a common neutral wire, wire 13 comprises a common ground and wire 14 comprises another hot wire. The potential drop between wires 11 and 14 would be 220 volts whereas the drop between wire 11 and common neutral 12 would be 110 volts, and similarly the voltage drop between wire 14 and common neutral 12 would be 110 volts. Wire 11 is ultimately operably connected to its own circuit breaker and wire 14 is operably connected to its own separate circuit breaker and accordingly, one effectively has two separate circuits. Wire 13 is a common safety ground for both circuits.

As will be apparent to those skilled in the electrical art, such an arrangement can be used in buildings having 220 volt service. In buildings having 110 volt service, one would have to substitute a five-wire arrangement (four-wire system plus ground) for the four-wire arrangement (three-wire system plus ground) shown and actually employ two distinctly separate circuits as opposed to a multi-branch circuit. One could still employ the common ground 13.

Because wires 11 and 12 on the one hand and wires 14 and 12 on the other function effectively as two different circuits, i.e., each on its own separate circuit breaker, these combinations will be referred to as two separate circuits just as though this were a five-wire arrangement as distinguished from a four-wire multi-branch circuit arrangement.

Wires 11, 12 and 13 are designed to function as a lighting circuit with a safety ground whereas wires 12, 13 and 14 are designed to function as a power circuit with a safety ground. Outlet receptacles 40 are operably connected to the power circuit whereas lighting units are connected to the lighting circuit. In this way, when an adding machine overload causes a circuit to break, the lights in the room do not go out. Further, it enables one to interconnect more panels for a larger number of work stations whan one could if all of the lighting and all of the office machinery were carried on a single circuit.

Clipped to ground wire 13 is a ground clip 15. One hooks this over the edge of wiring channel 30 to ground panel 1.

The wires 11 through 14 terminate at each end in a multi-position quick disconnect connector 20. The basic structure of each connector 20 is conventional, comprising molded plastic halves with slots through which strips of metal extend. Each strip of metal is crimped to one of the wires 11 through 14 and includes selective branches for branching off into particular terminals at particular positions on connector 20.

Projecting from one end of each connector 20 is a first set of three terminals 21. The top terminal is connected by a metallic strip to hot wire 11, the middle to neutral wire 12 and the bottom to common ground 13. This set of three terminals 21 is designed to facilitate connection of lighting to the lighting circuit which is defined by wires 11, 12 and 13.

Projecting laterally from only one side of "J" connector 20 is a second set of terminals 22. The top terminal is a closed off post in this embodiment, but is active in another embodiment discussed below. This serves no function in this embodiment of invention, and is included on connector 20 solely to facilitate molding. However in the alternative embodiment described below, this top terminal does become active and is wired with a connector as are the remaining terminals. The next terminal down is connected by a metallic strip to common neutral 12, the middle to common ground 13 and the bottom to hot wire 14. Thus, the second set of terminals 22 are designed to facilitate attachment of duplex receptacle units 40 to the power circuit defined by wires 12, 13 and 14.

A third set of terminals 23 projects laterally from one side of "J" connector 20 and a fourth set of terminals 24 project from the other side. There are four terminals in each of the third and fourth set of terminals 23 and 24. The top one is connected to hot wire 11, the second is connected to common neutral 12, the third to common ground 13 and the fourth to hot wire 14. Either set of terminals 23 or 24 provides a place to connect the quick disconnect terminal ends of panel power connector 50, or a "power-in" unit.

The configuration of first set of terminals 21 is different from that of second set of terminals 22 so that one cannot inadvertently connect the lighting to the power circuit or an outlet receptacle unit 40 to the lighting circuit. This would be extremely difficult in any event due to the configuration and construction of the receptacle units 40 relative to the arrangement of terminals on "J" connector 20.

Similarly, third set terminals 23 have an overall configuration which is distinctively relative to the configuration of first set 21. The bottom three terminals in third set 23 are identical to the three terminals in second set 22, but the top terminal in third set 23 has a distinctive configuration so that a receptacle unit 40 cannot be inadvertently interconnected to the lighting circuit. The location of mounting brackets 37 also prevent misalignment of receptacle unit 40.

The configuration of the fourth set terminals 24 is identical to the configuration of the third set terminals 23, except that the terminal corresponding to the uniquely configured top terminal of set 23 is located on the bottom in set 24. Providing a unique terminal at the top and bottom of third and fourth sets 23 and 24 makes it impossible to place panel power connector 50 on the system upside down, i.e., with its skirt 56 pointing up rather than down as it should. Yet, because the configuration of third set 23 and fourth set 24 as a whole is identical, except inverted, a panel power connector 50 can be used to electrically connect adjacent panels from either side of the panels. Artisans would refer to panel power connector as being "non-handed".

Each "J" connector 20 includes two pairs of integrally molded projecting detents 25 on one side thereof and a third integrally molded projecting detent 25 on the other side. These facilitate securance of "J" connectors 20 within wiring way 30. Each "J" connector 20 also includes a projecting connector flange 26 with an aperture 26a therethrough located such that when one attaches wiring way 30 to feet 70, the attaching bolts pass through the aperture 26a in connector flange 26 and serve to further secure "J" connectors 20 in place.

Wiring way 30 is formed of sheet metal and has a base wall 31, a sidewall 32 and a spaced opposite sidewall 33. Wiring way 30 is very narrow, just sufficiently wide to accommodate the relatively narrow width of "J" connectors 20 between sides 33 and 32. "J" connectors 20 themselves are only slightly wider than the diameters of any one of the wires 11 through 14.

Indeed, wiring way 30 is sufficiently narrow relative to the width of panel 1 and sufficiently short in height that when it is in position at the base of panel 1, there is room on at least one side to lay in casual wiring or communication cables and the like adjacent or beneath wiring way 30 with neither way 30 nor the casual wiring projecting beyond the planes defined by the opposite side faces of plane 1.

Wiring way 30 includes a second set terminal slot 34 at the right end of sidewall 32 and an identical second set terminal slot 32 at the right end (as one views it) of sidewall 33. When one slides "J" connector 20 into position between sidewalls 32 and 33, the second set terminals 22 fit into and project through slot 34.

Similarly, there is a third set terminal slot 35 at the right end of each of the sidewalls 32 and 33 and a fourth set terminal slot 36 directly opposite slot 35 at the left end of each of the sidewalls 32 and 33. Because the sidewalls 32 and 33 are shorter near the end of the channels these slots 35 and 36 are shallower. In any event, the third and fourth set terminals 23 and 24, respectively, fit into these slots when "J" connectors 20 are in place.

Walls 32 and 33 also include spaced detent receiving apertures 38 at the right end of each of them and another detent receiving aperture 38 near the left end of each of them. These detent receiving apertures 38 receive the integrally molded detents 25 on "J" connectors 20 when "J" connectors 20 are properly slid into position in between walls 32 and 33.

Once wiring 10 and "J" connectors 20 are positioned within wiring way 30, one has a very compact wiring package which can be readily attached to panel 1. Further, attachment can be accomplished from either side of panel 1. Such attachment is accomplished by the use of an elongated slot 39a at the left end of each of sidewalls 32 and 33, a relatively smaller but still elongated slot 39b at the right end and a threaded hole 39c adjacent elongated slot 39b. Elongated slot 39a is sufficiently long that both slot 39b and threaded hole 39c can be projected through it.

Each of the panel feet 70 are formed of steel and includes a flange 72 which projects inwardly towards the opposite foot and toward the end of wiring way 30. Flange 72 includes an elongated pass through slot 73 and an adjacent threaded aperture 74. Flanges 72 are arranged so that one positions way 30 within the base of panel 1 with enlarged slot 39a lying against flange 72 and overlying slot 73 and aperture 74. One can then secure way 30 in place from the side exposed in FIG. 1 by passing a screw through slot 73 at the left end of the panel, through slot 39a and threading it into aperture 39c. At the other end, one can pass a screw through a slot 39b, on through largr slot 39a and thread it into hole 74 in flange 72. If one went around the panel and faced the opposite side, one could perform the same operation and thus secure wiring way 30 from the opposite side from that viewed in FIG. 1 in the same way.

Welded at spaced points towards the right end of each sidewall 32 and 33 are a pair of outwardly projecting brackets 37 which serve as mounting points for the receptacle units 40. Each braket 37 includes a hole to receive a screw.

Each receptacle unit 40 comprises a molded plastic housing 41 within which a conventional plug receptacle plate 42 with conventional receptacle wiring is located. The internal wiring terminates in metal strips located within the three quick disconnect terminals 44 which project from the rear of housing 41. To place a receptacle unit 40 on a panel, one simply joins quick disconnect terminals 44 to second set quick disconnect terminals 22 on "J" connector 20 and then passes conventional screws through holes 43 on either side of housing 41 and threads the screws into the holes in receptacle mounting brackets 37. The term "conventional plug receptacle" as used herein, can be seen by reference to item 40 in FIG. 1 to refer to a standard, socket-type receptacle as used to receive the two or three pronged plugs typically found on typewriters, lamps, appliances and the like. These are sometimes referred to as "household" outlets. The term is used herein to distinguish outlets for receiving plug-in lighting and appliances from the connectors used to electrically couple wiring in the panel circuitry. It is often said that they have a "15 amp" configuration. They are adapted to receive either a conventional 2 or 3 prong plug therein.

Figure 2:
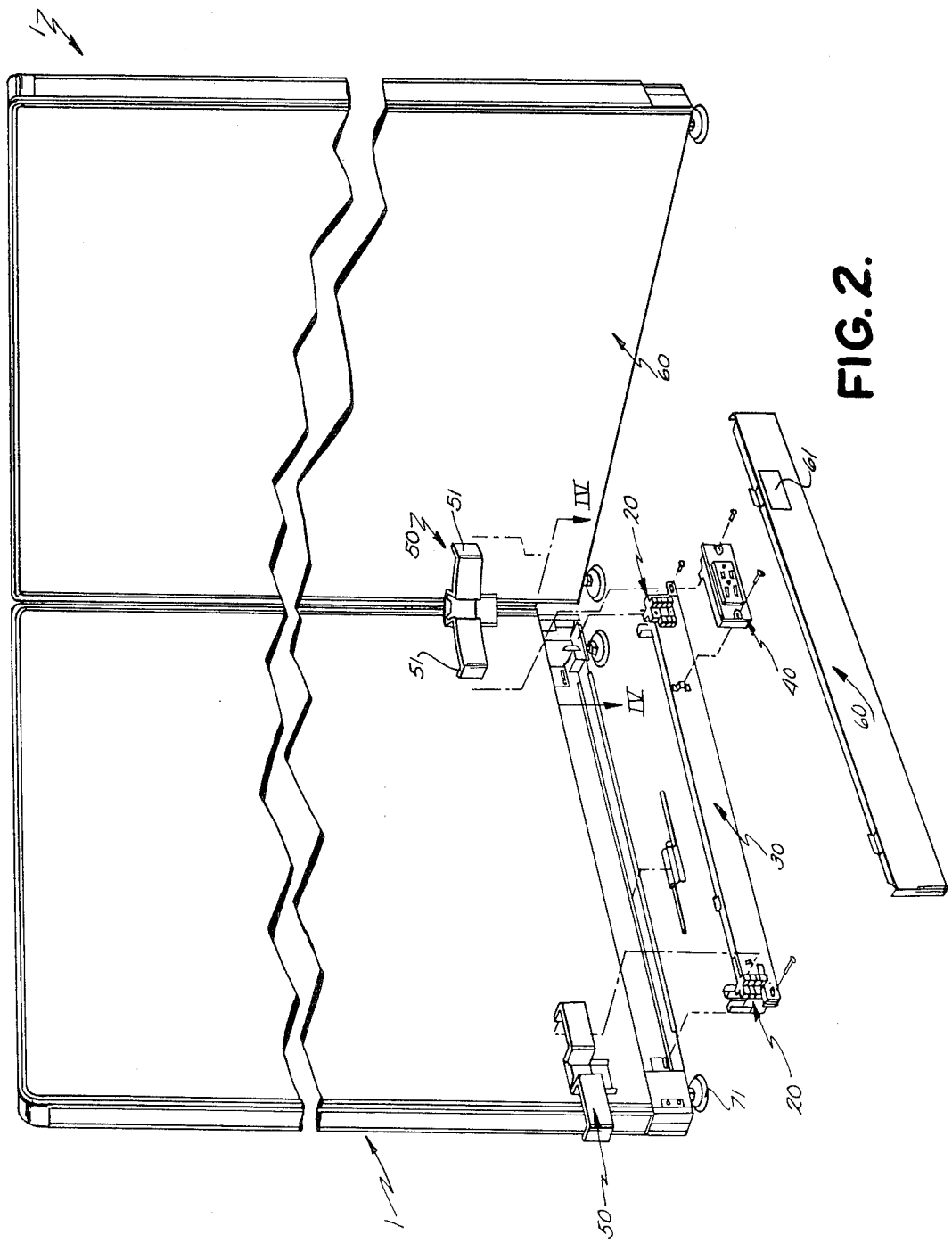
FIG. 2 is a perspective view of two panels hingedly joined together with the electrical components being exploded away from the bottom of one of them.
Figure 5:
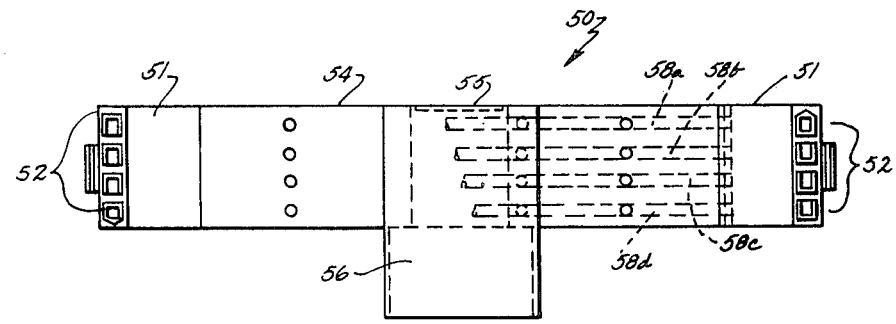
FIG. 5 is an elevational view of the panel-to-panel power connector of the present invention.

Each panel power connector 50 includes a generally L-shaped end 51 at each end thereof (FIGS. 1, 2 and 5). In essence, each end 51 comprises a molded plastic "L" connector with four quick disconnect terminals 52 molded therein. The "L" connector ends 51 are joined by four wires 58a through 58d which are molded into an elongated flexible molded polyvinyl chloride body 54. Body 54 includes a generally U-shaped deviation 55 therein which includes a base wall and spaced sidewalls. A skirt 56 depends downwardly below the generally U-shaped deviation 55 and, in essence, is a continuation of the exterior surfaces thereof. A frustopyramidal shaped flap 57 projects inwardly from the top of the base of U-shaped deviation 55 into the opening between the spaced sides thereof.

Figure 4:
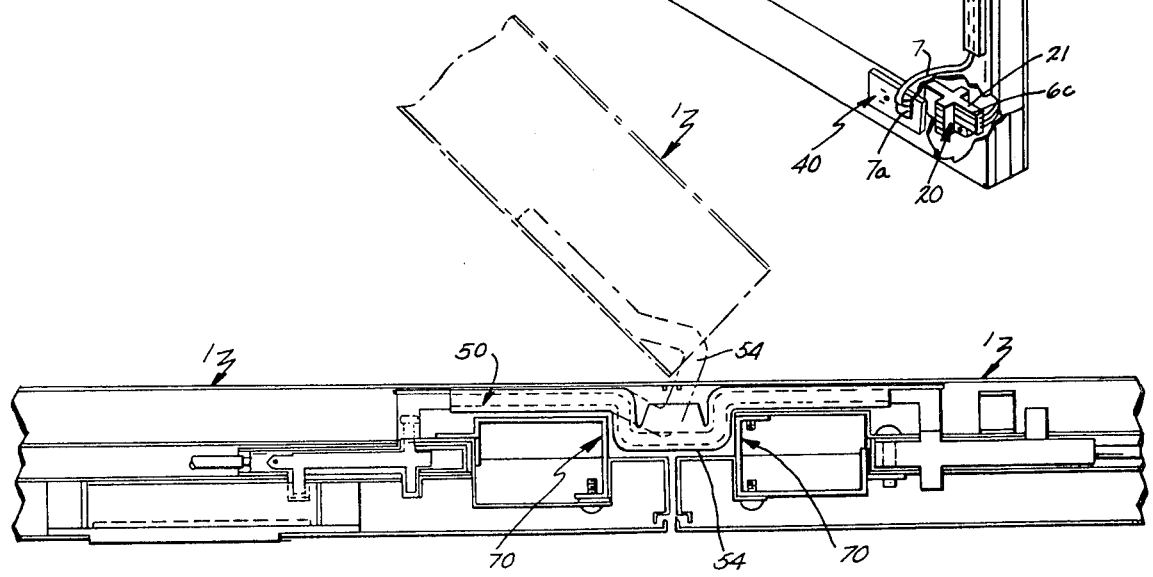
FIG. 4 is a cross-sectional top view of the end portions of two adjacently joined panels taken along plane IV—IV of FIG. 2.

In operation, one secures panel power connector 50 to third set terminals 23 at the left end of one panel 1 and to the fourth set of terminals 24 at the right end of the adjacent panel 1 with U-shaped deviation 54 extending into the space between feet 70 of the two adjacent panels (FIGS. 2 and 4). When one of the panels 1 is then hingedly moved relative to the other, as indicated in phantom in FIG. 4, flexible U-shaped deviation 54 has sufficient yield that it can accommodate the hinging movement. It allows the effective length of panel power connector 50 to lengthen or shorten depending on the relative angles of panels 1 relative to one another. As one does change the angle between adjacent panels 1 from 180°, the end edges of the adjacent panels become exposed and one can see panel power connector 50. However, skirt 56 and flap 57 tend to minimize the visual impact by eliminating the appearance of unsightly gaps either at the top of or below panel power connector 50.

Quick disconnect terminals 52 at "L" connector ends 51 of panel power connector 50 have configurations such that they will mate with either third set terminals 23 or fourth set terminals 24 on "J" connectors 20. In this way, power within both the lighting circuit and the power circuit of one panel is transferred to the power and lighting circuits in the next adjacent panel.

Once wiring way 30 and receptacle units 40, if desired, are in place at the base of a panel 1, and once any casual or communication wiring 1 desires located in the base is in place, the entire assembly can be covered by a conventional base wiring cover 60. Provision of such removable base trim covers on panels is known to those skilled in the art and the details thereof form no part of the present invention. It is important that base cover 60 include an outlet cutout 61 which allows the face of conventional receptacle 42 to be exposed when base cover 60 is in place. It is preferred to provide a metal closure plate within opening 61 which can readily be pushed out if base cover 60 is to be used on a unit with receptacle units 40 in place.

Figure 6:
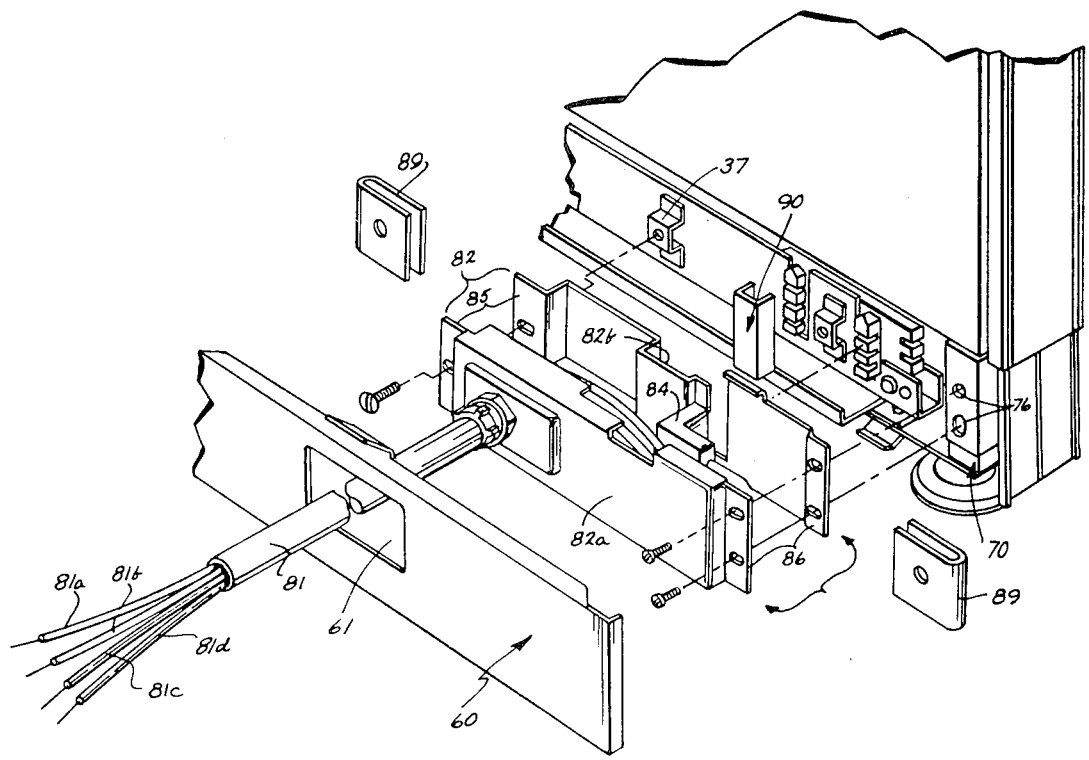
FIG. 6 is an exploded perspective view of the panel showing the manner in which power can be fed into the panel wiring system from the floor.

In addition to mounting flange 72, each panel foot 70 includes a threaded aperture in the base thereof to receive a threaded leveler 71 to facilitate leveling the panel 1 (FIGS. 1 and 6). It also includes another mounting flange 75 located on a side thereof opposite mounting flange 72. Mounting flange 75 facilitates mounting a base "power-in" unit 80 to the panel (FIG. 6). Base "power-in" unit 80 is shown in exploded form in FIG. 6. It includes a wiring cable 81 having four wires 81a through 81d therethrough. Wire 81a is a hot wire for the lighting circuit, 81b is a common neutral, 81c is a common ground and 81d is a hot wire for the power circuit.

Cable 81 extends into a housing 82 which is comprised of two joined halves 82a and 82b. The wires 81a through 81d terminate in a quick disconnect "L" connector 84 which has four terminals with a configuration designed to mate with third set terminals 23 on a "J" connector 20. Thus, their configuration corresponds to the quick disconnect terminals 52 on the right side of panel power connector 50 as viewed in FIG. 5. At one end of housing 82, there is a mounting flange 85 with one hole therein and at the other end of housing 82 there is a mounting flange 86 with two holes therein. The hole in mounting flange 85 is designed to line up with the left end mounting bracket 37 which is normally adapted to receive terminal unit 40. Clips 89 slip over these mounting flanges 85 and 86. By passing a screw through the hole in flange 85 and clip 89 and threading it into left bracket 37, one has secured one end of power-in unit 80 to panel 1.

The two holes in flange 86 line up with two threaded holes 76 in mounting flange 75 on foot 70. By passing screws therethrough (and one through the hole in clip 89) and threading them into the holes 76, one secures the other end of power-in unit 80 to panel 1. This entire assembly can then be covered with base wiring cover 60 and cable 81 passes out through the previously described aperture 61.

When base power-in unit 80 is used, second set terminals 22 are inaccessible. An optional terminal cap 90 snaps over terminals 22 for safety purposes.

Figure 8:
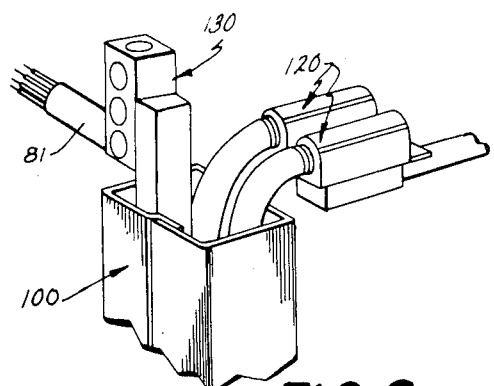
FIG. 8 is an enlarged view of that portion of FIG. 7 designated by numeral VIII.
Figure 9:
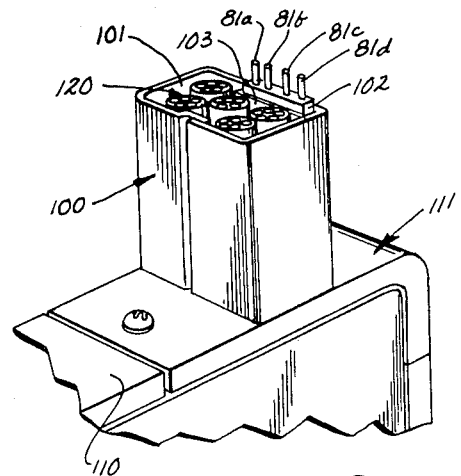
FIG. 9 is that portion of FIG. 7 designated by numeral IX.
Figure 7:
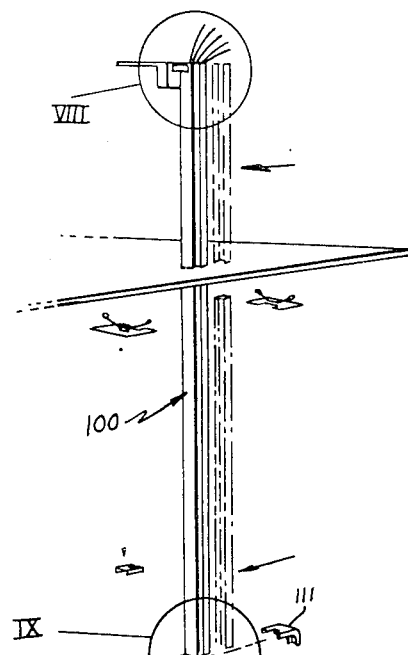
FIG. 7 is a perspective view of the panel with top power-in package showing the manner in which power can be fed into the system from the ceiling.

Power can also be fed into panel 1 from the top as is illustrated in FIG. 7. A hollow, generally rectangular in cross section utility pole 100 is bolted to an upper corner of panel 1 as illustrated in FIG. 9. Utility pole 100 is divided into two segments by a divider wall 103 (FIG. 9). The majority of the space within utility pole 100 comprises a communication wiring way 101 which receives communication wiring 120. The smaller compartment comprises a power way 102 which carries four wires 81a through 81d which enter utility pole 100 by way of cable 81 and a small terminal housing 130 which is fastened to the top of pole 100 (FIG. 8).

Figure 10:
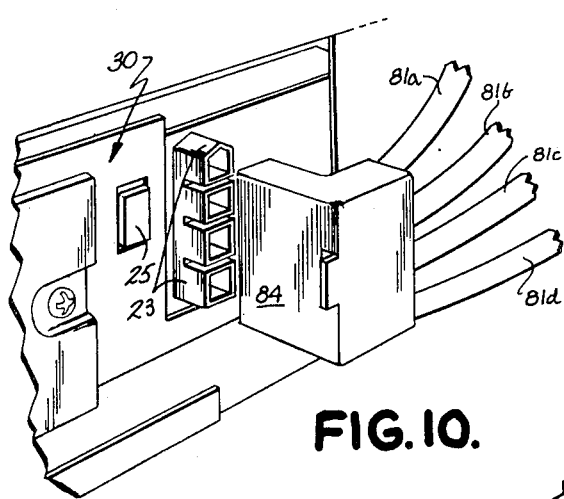
FIG. 10 is that portion of FIG. 7 designated by numeral X.

The wires 81a through 81d extend down through an appropriate wiring way passage extending from top to bottom of panel 1 and terminate in an "L" connector 84 just like that used in base "power-in" assembly 80 (FIG. 10). "L" unit 84 couples into quick disconnect terminals 23 as described previously.

To facilitate handling communication wiring and power wiring at the top of panel 1, panel 1 includes a removable corner cap 111 (FIGS. 7 and 9). It is designed to match with the general trim 110 of panel 1.

Figure 3:
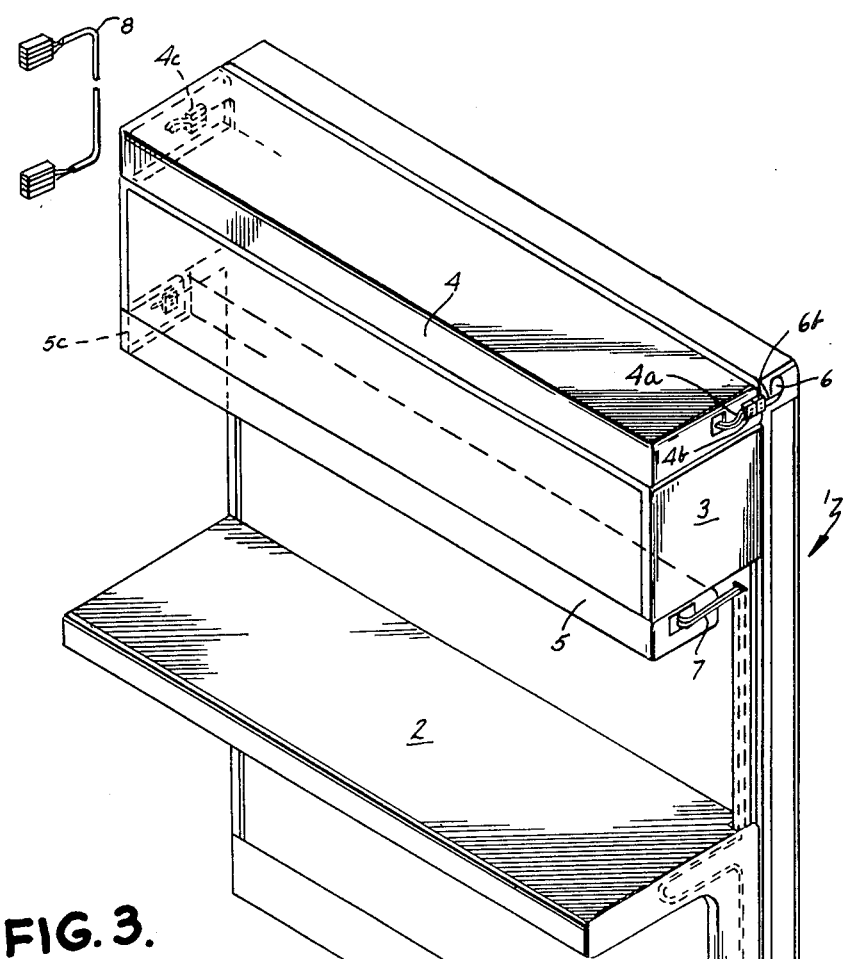
FIG. 3 is a perspective view of a panel made in accordance with the present invention and illustrating the versatility of the system facilitated by the employment of two separate circuits.

FIG. 3 shows an example of how a panel 1 made in accordance with the system of the present invention might be used. A work surface 2 is hung on the panel at about the middle thereof and a cabinet 3 is hung on panel 1 above work surface 2. An ambient light unit 4 is mounted on top of cabinet 3 and is intended to project light upwardly and reflect it off the ceiling to provide ambient light for the room. A task light 5 is mounted beneath cabinet 3 and is designed to project light directly downwardly onto work surface 2. Ambient light 4 includes wiring 4a extending therefrom to a quick disconnect 4b. Quick disconnect connector 4b can then be coupled to another quick disconnect connector 6b positioned on the end of a wire set 6 containing three wires which run down the height of panel 1 within an internal wiring way. Wire 6 terminates at the bottom at another quick disconnect connector 6c which is designed to matingly engage with the first set quick disconnect terminals 21 of "J" connector 20. In this way, ambient light unit 14 is electrically connected to the lighting circuit defined by wires 11, 12 and 13.

In contrast, task lighting unit 5 is electrically powered by a quick disconnect terminal 7a running a conventional cord 7 from task light 5 down through a wire manager on panel 1 and out the bottom where it is plugged in by means of a conventional plug 7a into one of the conventional plug receptacles in receptacle unit 40. A typewriter or other office equipment could similarly be plugged into the other side of receptacle 40.

Task lighting 5 would not have to be plugged into the bottom due to another unique aspect of the present invention. Located at the left end of ambient light unit 4 is a quick disconnect coupling 4c and located at the left end of task lighting unit 5 is another quick disconnect coupling 5c. These two quick disconnect couplings can be interconnected by means of wiring with mating quick disconnect cord set 8 at each end thereof for coupling into connectors 4c and 5c. In this way, the task lighting unit 5 can either be connected to the lighting circuit defined by wires 11, 12 and 13 or it can be plugged into the power circuit defined by wires 12, 13 and 14. Naturally, one would have to decide in advance which type of task lighting unit 5 he wanted and order it either with or without a conventional cord and plug 7 and 7a. This hookup is also available at the other end of lighting units 4 and 5 in case power cord 6 is brought up through the left end of panel 1.

As a result of the present invention, one can interconnect a greater number of panels on a given power and lighting circuit than he could do if there were only one circuit extending from panel to panel. Further, one can locate power outlet receptacles wherever they are needed. He does not need to worry about ordering his panels in advance with or without plug receptacles.

The system can be readily connected to the power source either from above as shown in FIG. 7 or from the ground as illustrated in FIG. 6. Because of the thin, compact nature of the wiring way 30, there is plenty of room for communication wiring or other casual wiring within the base area of panel 1.

In an alternative embodiment of this invention, two separate plug receptacles 140 and 240 are provided which are similar to plug receptacle 40 (FIGS. 11 through 14). The primary difference is that both receptacles 140 and 240 are provided with a set of four terminal locations 144 and 244 respectively, as distinguished from the set of three terminal locations 44 provided in receptacle 40 (FIG. 1). Also, the top terminal location in termainl set 22 of "J" connector 20 is active and includes an electrical contact connected to wire 11 of wiring set 10. In conventional outlet 140, the top terminal location 144a is not provided with an electrical contact while the three lower terminal locations, 144b through 144d are provided with contacts. Thus, when conventional plug receptacle 140 is connected to terminal set 22, it is effectively wired only to the power circuit defined by neutral wire 12, ground wire 13 and hot wire 14. In this respect, plug receptacle 140 is identical in function to plug receptacle 40 described hereinabove.

In contrast, the top terminal location 244a of terminal set 244 in conventional receptacle 240 is provided with a contact. So are terminal locations 244b and 244c located successively below terminal location 244a. However, the bottom terminal location 244d is not provided with a contact. Thus, when conventional plug receptacle 240 is plugged onto terminal set 22, it is effectively connected to hot line 11, neutral line 12 and ground 13. In essence, then, conventional plug receptacle 240 is connected to what has been referred to hereinabove as the lighting circuit. Conventional receptacle 240 thus enables one to join conventional plug receptacles to the lighting circuit while receptacle 140 and receptacle 40 allow one to connect a conventional plug receptacle to the power circuit.

Conventional receptacles 140 and 240 are molded in the same identical mold. They become functionally different because contacts are provided in different ones of their terminal locations.

The terminal locations 144 and 244 are shaped to mate with terminals 22. Further, the top terminal of set 22 and correspondingly, mating top terminals 144a and 244a, have unique configurations vis-a-vis the three lower terminal locations. It would be impossible to inadvertently overload the power circuits by adding conventional receptacle 240 to the system since conventional receptacle 240 will only plug into the lighting circuit and since it cannot be connected to terminal set 22 if accidently inverted. Similarly, it is impossible to overload the lighting circuit with conventional receptacles since conventional receptacle 140 can only be connected to the power circuit and cannot be connected if accidentally inverted. As will be noted by comparing FIGS. 11 and 13, each of the conventional receptacles is provided with an indication that it is either for "line 1", in this case the power circuit, or for "line 2", in this case the lighting circuit.

Of course, it is understood that the above is merely a preferred embodiment of the invention and that various changes and alterations can be made without departing from the spirit and broader aspects of the invention. For example, additional circuits could be added.

The embodiments of the present invention in which an exclusive property or privilege is claimed are defined as follows:

1. In a panel system comprised of at least two free standing movable room divider panels having enclosed electrical wiring, the improvement comprising: each of said panels having first wiring means defining a first circuit extending generally from one end edge of said panel to the other; second wiring means defining a second circuit extending generally from one end edge of said panel to the other; at least one connector mounted in each of said panels, and including first, second and third sets of quick disconnect terminals; said first set of quick disconnect terminals having a configuration which is not that of a conventional plug receptacle, and being electrically connected with said first wiring means for connecting lighting to said first circuit; lighting means mounted on at least one of said panels and including a fourth set of quick disconnect terminals matingly joined to said first set of quick disconnect terminals, whereby current is delivered to said lighting means through said first wiring means; said second set of quick disconnect terminals, having a configuration which is not that of a conventional plug receptacle, and being electrically connected with said second wiring means for connecting conventional plug receptacles to said second circuit; a conventional plug receptacle mounted on at least one of said panels, and having a fifth set of quick disconnect terminals matingly joined to said second set of quick disconnect terminals, whereby current is delivered to said conventional plug receptacle through said second wiring means; the configuration of said first set of quick disconnect terminals being different from the configuration of said second set of quick disconnect terminals, whereby said lighting means and said conventional plug receptacles cannot be inadvertently connected to a circuit not intended for them; said third set of quick disconnect terminals being electrically connected to both said first and second wiring means to facilitate electrical connection of both the first and second circuits in one panel to those in another panel; and panel power connector means joining said third set of quick disconnect terminals on the connector of one panel to the third set of quick disconnect terminals on the connector of the other panel.

2. The panel system of claim 1 in which said first wiring means comprises a first hot wire, a neutral wire and a ground wire, said second wiring means comprises a second hot wire and said neutral wire and said ground wire, said neutral and said ground wires being common to both said first and second wiring means; said first set of quick disconnect terminals comprising three terminals, each with an electrical contact therein, including a first terminal whose electrical contact is connected to said first hot wire, a second terminal whose contact is connected to said neutral wire, and a third terminal whose contact is connected to said ground wire; said second set of quick disconnect terminals comprising at least three terminals, each having an electrical contact therein, including one being connected to said second hot wire, another being connected to said ground wire, and a third being connected to said neutral wire; said third set of quick disconnect terminals comprising four terminals, each having an electrical contact therein, and including a first terminal whose electrical contact is connected to said first hot wire, a second terminal whose contact is connected to said neutral wire, a third terminal whose contact is connected to said ground wire and a fourth terminal whose contact is connected to said second hot wire.

3. The panel system of claim 1 in which said conventional plug receptacle is mounted in a housing to define an enclosed receptacle unit with said mating fifth set of quick disconnect terminals located on and projecting from said receptacle unit.

4. The panel system of claim 1 or 3 in which said terminals in said second set of quick disconnect terminals are arranged into first and second groups; said first group being connected to said first wiring means, and a second group being connected to said second wiring means; said fifth set of quick disconnect terminals electrically mating only with said second group of said second set of quick disconnect terminals, whereby said conventional plug receptacle can be connected only to said second wiring means.

5. The panel system of claim 4 in which said first wiring means comprises a first hot wire, a neutral wire and a ground wire, said second wiring means comprises a second hot wire and said neutral wire and said ground wire, said neutral and said ground wires being common to both said first and second wiring means; said second set of quick disconnect terminals comprising four separate terminals, a first terminal connected to said neutral wire, a second terminal connected to said neutral wire, a third terminal connected to said ground wire, and a fourth terminal connected to said second hot wire, all of said terminals including electrical contacts therein; said conventional plug receptacle, including four terminals thereon, comprising first, second, third and fourth terminals adapted for mating engagement with said first, second, thrid and fourth terminals respectively of said second set of quick disconnect terminals; said second, third and fourth terminals of said conventional plug receptacle including electrical contacts therein and said first terminal thereof being free of electrical contact means, whereby said conventional plug receptacle will electrically connect only with said second wiring means.

6. The panel system of claim 5 in which one of said four terminals of said second set of quick disconnect terminals, and each corresponding terminal of said conventional plug receptacle has a unique configuration with respect to the rest of said terminals, whereby one cannot inadvertently connect said conventional plug receptacle to said first set of quick disconnect terminals in inverted orientation or vertical misalignment.

7. A multiple terminal J-connector for panel systems of the type comprising at least two, free standing movable room divider panels having enclosed electrical wiring, and wherein each of said panels has first wiring means defining a lighting circuit extending generally from one end edge of said panel to the other, and second wiring means defining a power circuit extending generally from one end edge of said panel to the other; said J-connector comprising:
a generally J-shaped connector body adapted for mounting on the panels;
a first set of quick disconnect terminals projecting from said connector body in the direction of the panel ends, and defining first connector means connected with the first wiring means for connecting lighting to the lighting circuit;
a second set of quick disconnect terminals projecting laterally from at least one side of said connector body, and defining second connector means connected with the second wiring means for connecting conventional plug receptacles to the power circuit;
a third set of quick disconnect terminals projecting laterally from one side of said connector body at a point spaced from said second set of terminals, and defining third connector means operably connected to both the first and second wiring means to facilitate electrical connection of both the power and lighting circuits in one panel to those in another panel.

8. A multiple terminal J-connector as set forth in claim 7, wherein:
said first and second sets of terminals have a dissimilar configuration to prevent connecting lighting and power appliances with a circuit not intended for them.

9. A multiple terminal J-connector as set forth in claim 7, wherein:
said third set of terminals has a configuration which is dissimilar to the configurations of said first and second sets of terminals to prevent improper wiring connections.

10. A multiple terminal J-connector as set forth in claim 7, wherein:
said first, second and third sets of terminals each have a configuration which is not that of a conventional, 15-amp type of plug receptacle.

11. A multiple terminal J-connector as set forth in claim 7, wherein:
said first set of quick disconnect terminals comprises three terminals, each with an electrical contact therein, and including:
a first terminal whose electrical contact is adapted for connection with a first, hot wire;

a second terminal whose contact is adapted for connection with a neutral wire; and a third terminal whose contact is adapted for connection with a ground wire.

12. A multiple terminal J-connector as set forth in claim 7, wherein:

said second set of quick disconnect terminals comprises at least three terminals, each having an electrical contact therein, with one being connected to a second hot wire, another being connected with the ground wire and the third being connected with the neutral wire.

13. A multiple terminal J-connector as set forth in claim 7, wherein:

said third set of quick disconnect terminals comprises four terminals, each having an electrical contact therein, and including a first terminal whose electrical contact is adapted for connection with the first hot wire, a second terminal whose contact is adapted for connection with the neutral wire, a third terminal whose contact is adapted for connection with the ground wire, and a fourth terminal whose contact is adapted for connection with the second hot wire.

14. A multiple terminal J-connector as set forth in claim 7, wherein:

said second set of quick disconnect terminals comprises four separate terminals, including a first terminal adapted for connection with a neutral wire, a second terminal adapted for connection with a neutral wire, a third terminal adapted for connection with a ground wire, and a fourth terminal adapted for connection with a second hot wire.

15. A multiple terminal J-connector as set forth in claim 7, wherein: one terminal of said second set of quick disconnect terminals has a unique configuration with respect to the rest of the terminals, whereby one cannot inadvertently connect the conventional receptacles to said second set of quick disconnect terminals in inverted orientation or vertical misalignment.

16. A multiple terminal J-connector as set forth in claim 7, including:

a fourth set of quick disconnect terminals projecting laterally from that side of said connector body opposite said third set of terminals, and defining a second one of said third connector means.

17. A multiple terminal J-connector as set forth in claim 16, wherein:

said fourth set of quick disconnect terminals comprises four terminals, each having an electrical contact therein, and including a first terminal whose electrical contact is adapted for connection with the first hot wire, a second terminal whose contact is adapted for connection with the neutral wire, a third terminal whose contact is adapted for connection with the ground wire, and a fourth terminal whose contact is adapted for connection with the second hot wire.

18. A multiple terminal J-connector as set forth in claim 16, wherein:

said first and second sets of terminals have a dissimilar configuration to prevent connecting lighting and power appliances with a circuit not intended for them.

19. A multiple terminal J-connector as set forth in claim 18, wherein:

said third set of terminals has a configuration which is dissimilar to the configurations of said first and second sets of terminals to prevent improper wiring connections.

20. A multiple terminal J-connector as set forth in claim 19, wherein:

said first, second and third sets of terminals each have a configuration which is not that of a conventional, 15-amp type of plug receptacle.

21. A multiple terminal J-connector as set forth in claim 20, wherein:

said first set of quick disconnect terminals comprises three terminals, each with an electrical contact therein, and including:

a first terminal whose electrical contact is adapted for connection with a first, hot wire;

a second terminal whose contact is adapted for connection with a neutral wire; and a third terminal whose contact is adapted for connection with a ground wire.

22. A multiple terminal J-connector as set forth in claim 21, wherein:

said second set of quick disconnect terminals comprises at least three terminals, each having an electrical contact therein, with one being connected to a second hot wire, another being connected with the ground wire and the third being connected with the neutral wire.

23. A multiple terminal J-connector as set forth in claim 22, wherein:

said third set of quick disconnect terminals comprises four terminals, each having an electrical contact therein, and including a first terminal whose electrical contact is adapted for connection with the first hot wire, a second terminal whose contact is adapted for connection with the neutral wire, a third terminal whose contact is adapted for connection with the ground wire, and a fourth terminal whose contact is adapted for connection with the second hot wire.

24. A multiple terminal J-connector as set forth in claim 23, wherein:

said fourth set of quick disconnect terminals comprises four terminals, each having an electrical contact therein, and including a first terminal whose electrical contact is adapted for connection with the first hot wire, a second terminal whose contact is adapted for connection with the neutral wire, a third terminal whose contact is adapted for connection with the ground wire, and a fourth terminal whose contact is adapted for connection with the second hot wire.

25. A multiple terminal J-connector as set forth in claim 21, wherein:

said second set of quick disconnect terminals comprises four separate terminals, including a first terminal adapted for connection with a neutral wire, a second terminal adapted for connection with a neutral wire, a third terminal adapted for connection with a ground wire, and a fourth terminal adapted for connection with a second hot wire.

26. A multiple terminal J-connector as set forth in claim 25, in which one of said four terminals of said second set of quick disconnect terminals has a unique configuration with respect to the rest of said terminals, whereby one cannot inadvertently connect said conventional receptacle to said second set of quick disconnect terminals in inverted orientation or vertical misalignment.

27. A multiple terminal J-connector for panel systems of the type comprising at least two, free standing movable room divider panels having enclosed electrical wiring, and wherein each of said panels has first wiring means defining a first circuit extending generally from one end edge of said panel to the other, and second wiring means defining a second circuit extending generally from one end edge of said panel to the other; said J-connector comprising:
- a generally J-shaped connector body adapted for mounting on the panels;
- a first set of quick disconnect terminals projecting from said connector body in the direction of the panel ends, and defining first connector means connected with the first wiring means for connecting appliances to the first circuit;
- a second set of quick disconnect terminals projecting laterally from at least one side of said connector body, and defining second connector means connected with the second wiring means for connecting appliances to the second circuit;
- a third set of quick disconnect terminals projecting laterally from one side of said connector body at a point spaced from said second set of terminals, and defining third connector means operably connected to both the first and second wiring means to facilitate electrical connection of both the first and second circuits in one panel to those in another panel.

* * * * *

UNITED STATES PATENT AND TRADEMARK OFFICE
CERTIFICATE OF CORRECTION

PATENT NO. : 4,429,934

DATED : February 7, 1984

INVENTOR(S) : Harold L. VandenHoek et al.

It is certified that error appears in the above-identified patent and that said Letters Patent is hereby corrected as shown below:

Column 4, line 19:
"whan" should be --than--;

Column 5, line 53:
"plane" should be --panel--;

Column 6, line 39:
"braket" should be --bracket--;

Column 7, line 39;
"1" should be --one--;

Column 6, line 31:
"largr" should be --larger--;

Column 7, line 60:
after "81d" insert --passing--;

Column 9, line 48:
"termainl set" should be --terminal set--;

Column 9, line 66:
"onto" should be --into--;

Column 11, Claim 5, line 66:
"thrid" should be --third--;

UNITED STATES PATENT AND TRADEMARK OFFICE
CERTIFICATE OF CORRECTION

PATENT NO. : 4,429,934

DATED : February 7, 1984

INVENTOR(S) : Harold L. VandenHoek et al.

It is certified that error appears in the above-identified patent and that said Letters Patent is hereby corrected as shown below:

Column 14, Claim 25, line 53:
"21" should be --20--;

Column 14, Claim 26, line 65:
"said" should be --the--.

Signed and Sealed this

Second Day of April 1985

[SEAL]

Attest:

DONALD J. QUIGG

Attesting Officer   Acting Commissioner of Patents and Trademarks